Figure 1:
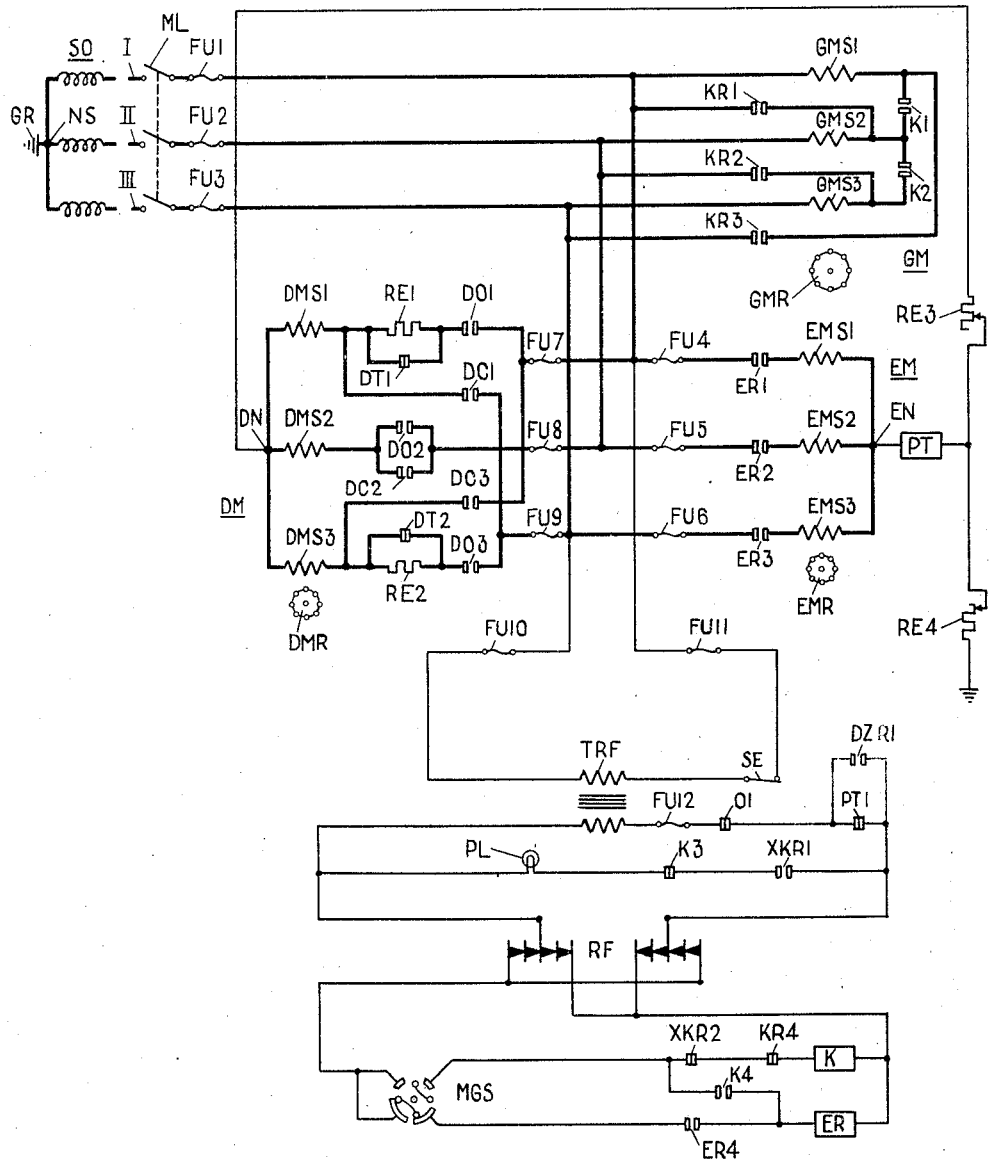

April 22, 1947. J. D. LEWIS ET AL 2,419,269
PROTECTIVE APPARATUS FOR POLYPHASE ALTERNATING CURRENT UNITS
Filed May 28, 1945 4 Sheets-Sheet 4

Jacob Daniel Lewis
Matthew Troster, Jr.,
Norman William Soderberg } INVENTORS
BY Walter E. Bradley ATTORNEY Patented Apr. 22, 1947

2,419,269

UNITED STATES PATENT OFFICE 2,419,269

PROTECTIVE APPARATUS FOR POLYPHASE ALTERNATING CURRENT UNITS

Jacob Daniel Lewis, Yonkers, Mathew Troster, Jr., New York, and Norman William Sederberg, Flushing, N. Y., assignors to Otis Elevator Company, New York, N. Y., a corporation of New Jersey Application May 28, 1945, Serial No. 596,284

13 Claims. (Cl. 187—29)

1

The invention relates to open phase protection of polyphase alternating current apparatus, such as three-phase induction motors of elevator installations.

In elevator systems having three-phase alternating current power supply, there are certain advantages in utilizing a direct current hoisting motor supplied with current from a direct current variable voltage generator driven by a three-phase induction motor connected to said power supply. In many of these installations a direct current exciter is utilized to supply current to certain of the control switches and the fields of the elevator hoisting motor and its supply generator, with the exciter driven by a three-phase induction motor connected to the power supply in parallel with the generator driving motor. In some of these installations a three-phase induction motor adapted for connection to the power supply in parallel with the driving motors is used to operate the hoistway doors and/or car door. When an open phase condition arises there may be an increase in current flow in the stator windings of such value as to cause excessive heating and if allowed to continue severe damage might result.

It is an object of the invention to provide a protective device which is common to a plurality of three-phase induction motors adapted for connection in parallel to a three-phase source of supply for protecting these motors under open phase conditions.

Another object of the invention is to provide a control for a three-phase induction driving motor of the motor generator set of an elevator installation which, when an open phase condition arises during operation of the car with the load on the motor above a certain amount, reduces the load on the driving motor to enable the car to be brought to a landing without damage to the driving motor.

The invention will be described as applied to an elevator installation having three-phase alternating current supply. The elevator hoisting motor is a direct current motor supplied with current by a variable voltage generator driven by a three-phase induction motor supplied with current from the alternating current supply lines. An exciter is also driven by a three-phase induction motor supplied with current from the supply

2 lines in parallel with the generator driving motor. In carrying out the invention according to the arrangement which will be described the protective device is in the form of a relay having its operating coil connected between a neutral for the exciter driving motor and a neutral for the supply lines. When due to an open phase condition affecting only the exciter driving motor single-phase voltage is applied to the exciter driving motor under the load conditions on the exciter which exists when the car is in operation, a potential difference exists between these neutrals sufficient to operate the relay. When the open phase condition is in the supply lines common to both the exciter driving motor and the generator driving motor, the generator driving motor, being in parallel with the exciter driving motor, acts as a generator to apply three-phase excitation to the exciter driving motor. However, the three-phase excitation provided by the generator driving motor is unbalanced when this motor is subjected to load, the greater the load the greater the unbalance and the greater the unbalance the greater the potential difference between the neutrals. The protective relay is set to operate at the potential difference which exists between the neutrals when the load on the generator driving motor is considerably less than that at which the increased current flow in the stator windings of this motor due to open phase conditions would if allowed to continue cause dangerous heating and possibly severe damage to the motor windings. The protective relay, upon operation, reduces the speed of the car and thus the load on the generator driving motor, enabling the car to be brought to a landing. Thereafter the driving motors are disconnected from the supply lines and can not be restarted until the open phase condition is corrected.

A three-phase induction motor is employed in the installation as a door operating motor. This motor is also adapted for connection to the supply lines in parallel with the generator driving motor and exciter driving motor. A neutral for the door operating motor is connected to the side of the protective relay coil opposite to that to which the exciter driving motor neutral is connected. In this way sufficient voltage is applied to the protective relay operating coil to operate the relay when it is attempted to operate the door motor under open phase conditions affecting only the door motor.

Features and advantages of the invention will be seen from the above statements and from the description and claims which follow.

Figure 2:
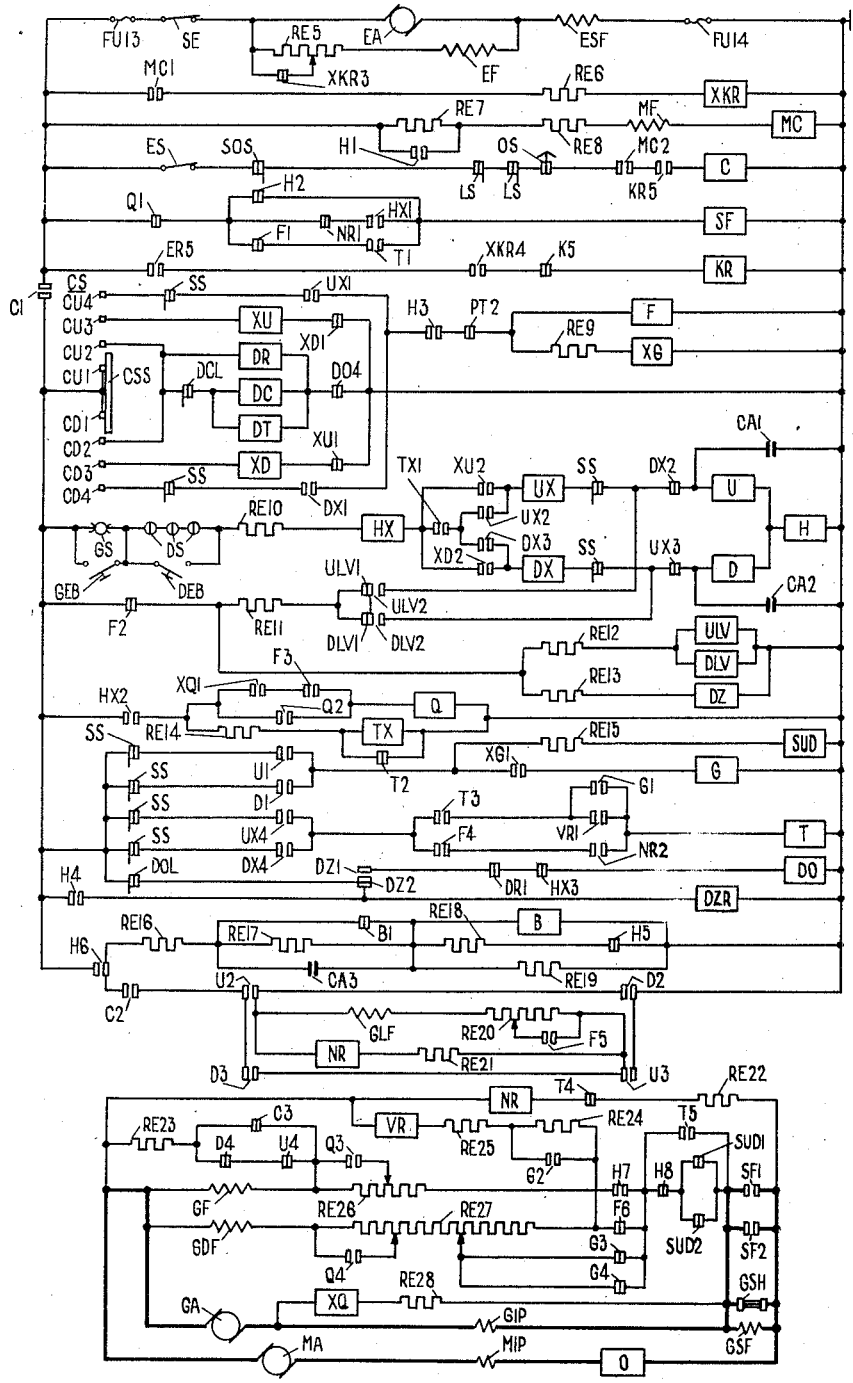
Figure 1S:
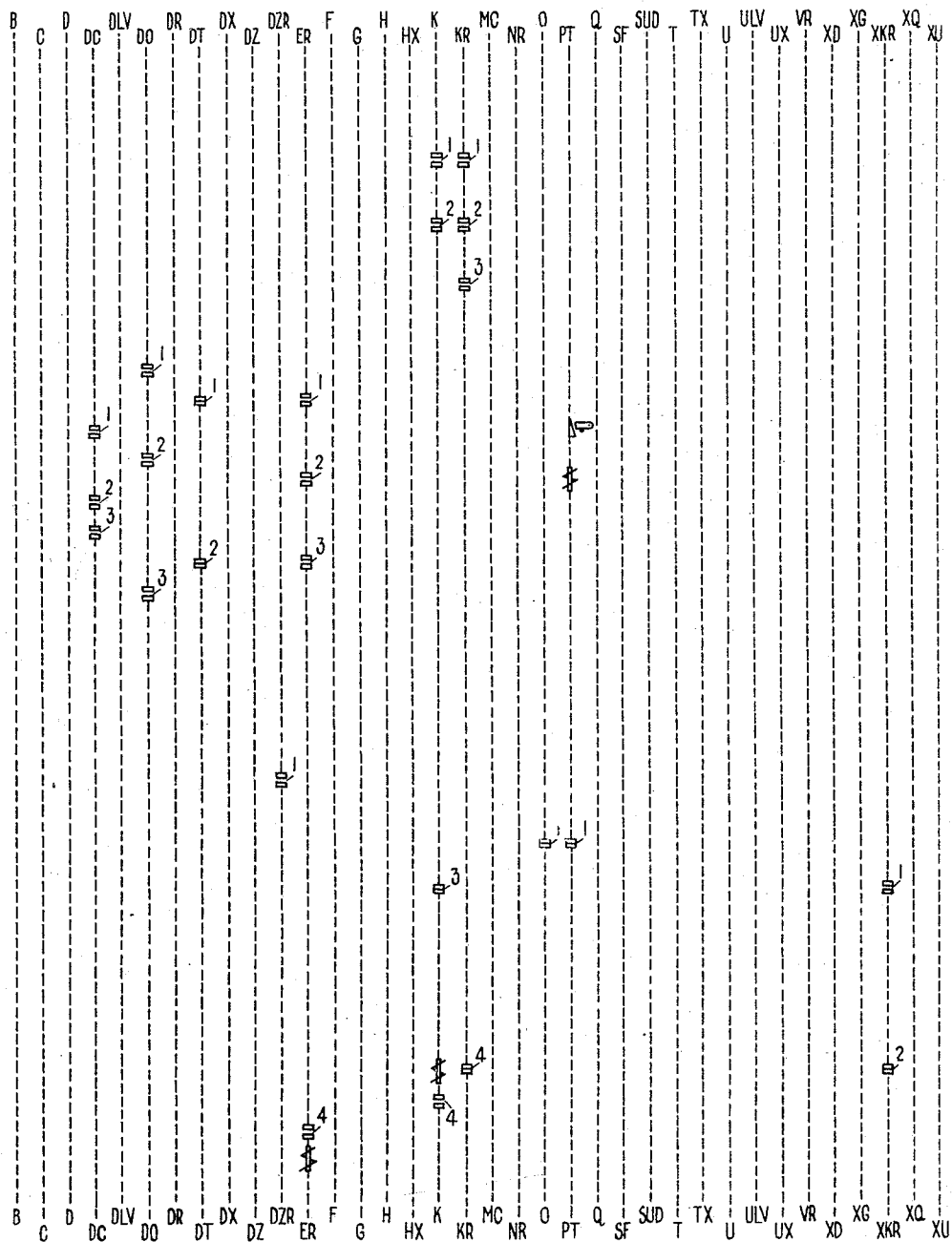
Figure 2S:
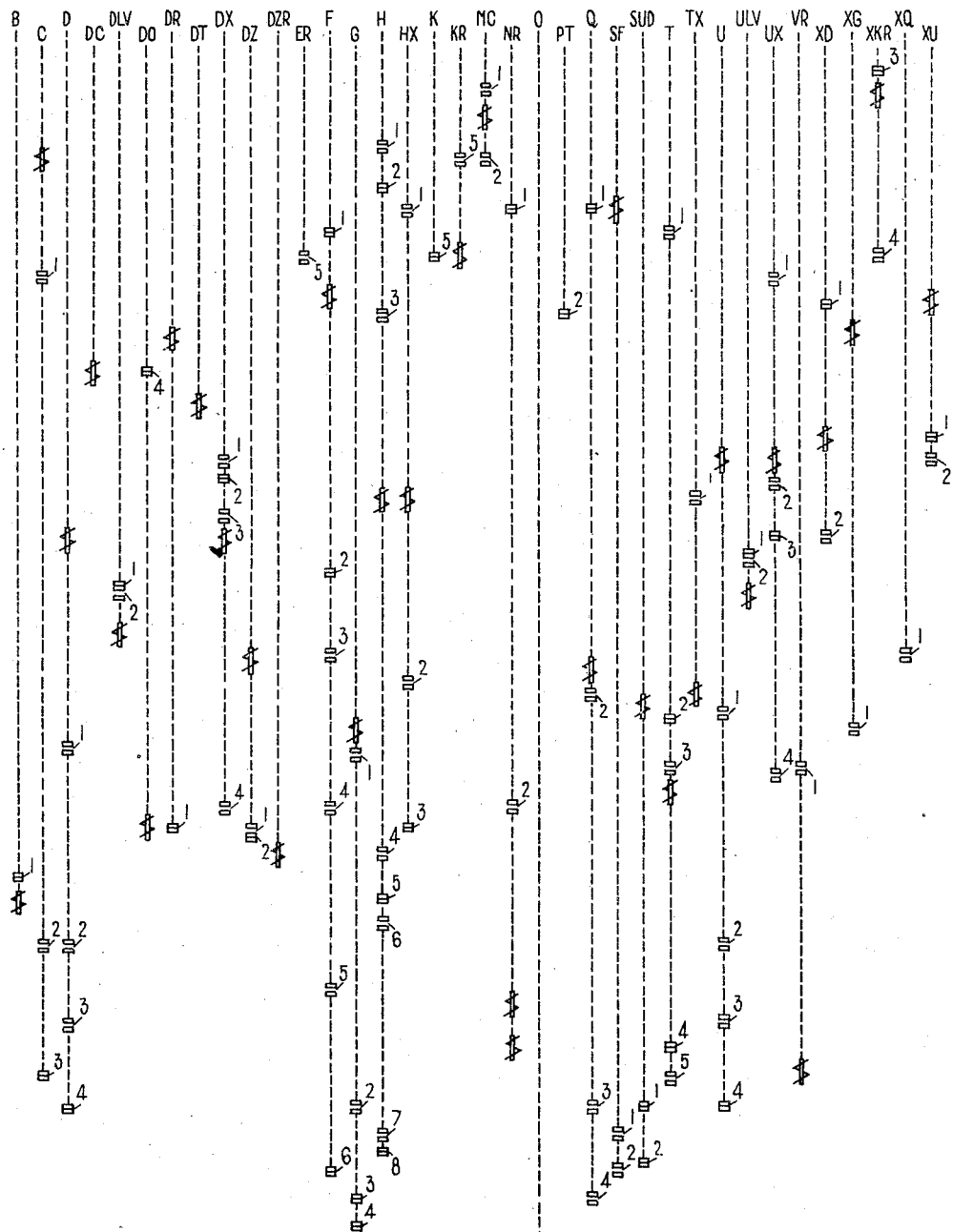

In the drawings:

Figures 1 and 2 taken together constitute a "straight" or "across-the-line" wiring diagram of a variable voltage elevator system with three-phase alternating current supply lines embodying the invention, Figure 1 illustrating principally the three-phase power circuits; and Figures 1s and 2s are spindle sheets for Figures 1 and 2 respectively, illustrating the electromagnetic switches in spindle form with the contacts and coils arranged on the spindles in horizontal alignment with the corresponding contacts and coils in the wiring diagram with the spindle sheets horizontally aligned with the wiring diagrams.

Referring to the drawings, I, II and III are the supply lines from a three-phase alternating current source SO having a neutral NS connected to ground GR. ML is the main line switch for the elevator system in the supply lines. A direct current motor is employed for raising and lowering the car and is supplied with current from a variable voltage generator. The armature of the elevator hoisting motor is designated MA, its interpole field winding MIP and its separately excited field winding MF. The armature of the generator is designated GA. The generator is provided with five field windings namely, interpole field winding GIP, series field winding GSF, shunt field winding GF, demagnetizing field winding GDF and levelling field winding GLF. The levelling field winding also serves as a direction field winding to establish the generator polarity in starting the car. The generator is driven by a three-phase squirrel cage induction motor GM. The stator windings of this motor are designated GMS1, GMS2 and GMS3 and its rotor GMR.

The generator levelling field winding GLF, elevator motor field winding MF, the release coil for the electro-mechanical brake and the coils of certain electromagnetic switches are supplied with current from an exciter. The armature of the exciter is designated EA, its shunt field winding EF and its series field winding ESF. The exciter is driven by a three-phase squirrel cage induction motor EM. The stator windings of this motor are designated EMS1, EMS2 and EMS3 and the rotor is designated EMR.

The generator driving motor and exciter driving motor are supplied with current directly from the alternating current supply lines. Also a three-phase squirrel cage induction motor DM, employed for operating the elevator hoistway doors and car door, is supplied with current directly from the alternating current supply lines. The stator windings of the door operating motor are designated DMS1, DMS2 and DMS3 and the rotor is designated DMR. Current for the coils of certain other electromagnetic switches principally for controlling the motor generator set and exciter set is derived from the alternating current supply lines. In the system illustrated a rectifier RF is interposed between the supply lines and the switches to permit direct current switches to be employed. The transformer TRF is interposed between the rectifier and the supply lines to obtain the desired operating voltage for the switches.

The electromagnetic switches have been designated as follows:

C—Potential switch
D—Down direction switch
DC—Door close switch
DO—Door open switch
DR—Door control switch
DT—Door reversal time switch
DX—Auxiliary down direction switch
DZR—Door zone relay
ER—Exciter switch
F—First slow speed switch
G—Second slow speed switch
H—Field and brake switch
HX—Auxiliary field and brake switch
K—Starting switch
KR—Running switch
MC—Minimum current shunt field switch
NR—Non-reversal switch
O—Overload switch
PT—Protective relay
Q—Load switch
SF—Series field switch
SUD—Suicide delay relay
T—Fast speed switch
TX—Auxiliary fast speed switch
U—Up direction switch
UX—Auxiliary up direction switch
VR—Voltage relay
XD—Down direction switch relay
XG—Second slow speed switch relay
XKR—Running switch relay
XQ—Load switch relay
XU—Up direction switch relay Throughout the description which follows these letters will be applied to the coils of the above designated switches. Also, with reference numerals appended thereto they will be applied to the contacts of these switches, as for example, C1.

The system is illustrated as including mechanism for bringing the car to an exact landing regardless of whether it underruns or overruns the landing. This levelling mechanism is of the type in which electromagnetic switching mechanism carried by the car is operated by being brought under the influence of a magnetizable plate in the hoistway, one for each landing. The levelling mechanism comprises up levelling switch ULV and down levelling switch DLV. Similar switching mechanism carried by the car for cooperating with magnetizable plates in the hoistway, one for each landing, is utilized to control the operation of the door. This switching mechanism which will be termed door zone switch is designated DZ. The release coil of the electromechanical brake is designated B. The levelling switches, door zone switch and brake release coil and contacts operated by the brake are included on the spindle sheet along with the electromagnetic switches.

The control system illustrated is of the type in which both the stopping and starting of the car is controlled by an operator in the car. A car switch CS is provided in the car for the use of the operator in effecting starting and stopping of the car, the car switch segment being designated CSS and the stationary contacts engaged thereby being designated CU1, CU2, CU3 and CU4 for up car travel, and CD1, CD2, CD3 and CD4 for down car travel. MGS is a key operated switch for effecting the starting of the motor generator set and exciter set. PL is a pilot light for indicating when these sets are in operation.

The car door contacts are designated GS while the hoistway door contacts are designated DS. Three sets of hoistway door contacts are shown as indicative of a three floor installation. The system is arranged so that the car door and the hoistway door at the landing at which the car is positioned are open when the car is parked. GEB and DEB are switches for enabling operation of the car with the car door contacts and hoistway door contacts open. ES is an emergency stop switch in the car. SE is a service switch on the control panel. LS designates the limit switches at the upper and lower terminals while SS designates contacts of the terminal stopping switch. SOS is a safety operated switch and OS is an over-speed governor operated switch DCL and DOL are limit switches for the door operating mechanism. GSH is a shunt for the generator series field winding. Fuses are designated generally as FU. Condensers are designated generally as CA. Resistances are designated generally as RE.

Assume that main line switch ML is closed so that voltage is applied to the system from the alternating current supply lines. To start the motor generator set and the exciter set, key operated switch MGS is turned counterclockwise, connecting the coil of starting switch K across rectifier RF. Switch K, upon operation, engages contacts K1 and K2, connecting the stator windings of the driving motor GM of the motor generator set in star relationship to the supply lines. Contacts K4 connect the coil of the exciter switch ER across the rectifier. Switch ER, upon operation, engages contacts ER1, ER2 and ER3 connecting the stator windings of the exciter driving motor EM to the supply lines. Thus both the motor generator set and exciter set are started in operation. Switch ER also engages contacts ER4 to establish a holding circuit through the lower contacts of switch MGS for the coil of switch ER and also through contacts K4 for the coil of switch K. This enables switch MGS to be returned to neutral, the lower contacts remaining bridged in this position.

As a result of starting the exciter set, the elevator motor field builds up as its field winding MF is connected across the exciter armature. When this field builds up to a certain value, minimum current shunt field switch MC operates, engaging contacts MC1 to complete the circuit for the coil of running switch relay XKR. Also series field switch SF operates, engaging contacts SF1 and SF2 to short circuit generator series field winding GSF.

Switch XKR, upon operation, separates contacts XKR3, removing the short circuit for the portion of resistance RE5 controlled thereby to decrease the excitation of exciter field winding EF. This resistance portion is short circuited for the purpose of forcing the exciter field to cause the exciter quickly to build up to full voltage. By subjecting relay XKR to the minimum current shunt field switch, the short circuit for the field forcing resistance is removed as the exciter comes up to full voltage. Switch XKR also separates contacts XKR2 to break the circuit for the coil of switch K. Switch K, upon dropping out, reengages contacts K5 which completes the circuit for the coil of reversing switch KR. Thus as contacts K1 and K2 separate to break the star connection of the stator windings of driving motor GM, switch KR operates to engage contacts KR1, KR2 and KR3 to connect these windings in delta relationship. Thus the stator windings of the driving motor for the motor generator set are transferred from star to delta connection. Switch KR also engages contacts KR5 which completes the circuit for the coil of potential switch C. The reengagement of contacts K3 of the starting switch causes lighting of pilot light PL, advising the operator of the car that it may now be started in operation.

The operator may start the car in the up direction by moving the car switch segment CSS in position to bridge contacts CU1—CU4. The bridging of contacts CU1 and CU2 completes the circuits for the coils of door close switch DC, door control switch DR and door reversal time switch DT. Switch DC operates to engage contacts DC1, DC2 and DC3 completing a circuit for the stator windings of the door operating motor for operation to effect the closure of the hoistway door and car door. With the car standing at a floor door zone switch DZ is operated to engage contacts DZ1 and separate contacts DZ2. Contacts DR1, separated as the result of the operation of door control switch DR, prevent the energization of the coil of door open switch DO upon the closure of the door limit switch DOL in the door closing operation. As the doors reach closed position door close limit switch DCL opens to break the circuit for the coils of door close switch DC and door reversal time switch DT. Switch DC, upon dropping out, breaks the circuit for the stator windings of the door operating motor.

The bridging of car switch contacts CU1 and CU3 completes the circuit for the coil of up direction switch relay XU. Switch XU engages contacts XU2 so that upon the closure of the doors to effect the engagement of car door contacts GS and hoistway door contacts DS a circuit is completed for the coils of auxiliary field and brake switch HX, auxiliary up direction switch UX, up direction switch U and field and brake switch H. Switch U, upon operation, engages contacts U2 and U3 in the circuit for generator levelling field winding GLF. At the same time switch H engages contacts H6 to complete the circuit for field winding GLF and also the circuit for the brake release coil B, causing the starting of the car in the up direction. The brake in releasing separates contacts B1 to insert cooling resistance RE17 in circuit with its coil. Switch H engages contacts H1 which short circuits resistance RE7, bringing the elevator field winding MF up to full strength.

The non-reversal relay NR is provided with two coils, one connected across generator levelling field winding GLF and the other connected across generator armature GA. These coils act cumulatively when the generator voltage builds up in the direction indicated by the operated direction switch and when this voltage reaches a certain value the relay operates to separate contacts NR1. Owing to the fact that the circuit for the coil of series field switch SF has been transferred to the control of contacts NR1 by the separation of contacts H2 and the engagement of contacts HX1, the series field switch drops out to separate contacts SF1 and SF2, removing the short circuit for generator series field winding GSF.

The bridging of contacts CU1 and CU4 completes the circuit for the coils of first slow speed switch F and second slow speed switch relay XG. Switch F, upon operation, engages contacts F5 to short circuit a portion of resistance RE20 increasing the strength of the generator levelling field to increase the speed of the car. It also engages contacts F4 which completes a circuit for the coil of fast speed switch T. Relay XG engages contacts XG1 to complete a circuit for the coil of second slow speed switch G. Switch T, upon operation, separates contacts T2 to remove the short circuit for the coil of auxiliary fast speed switch TX. As the circuit for this coil is completed at contacts HX2 this switch operates to engage contacts TX1 to establish through contacts UX2 a by-pass for contacts XU2 in the circuit for the coils of HX, UX, U and H. Switch T also separates contacts T4 to break the circuit for the coil of switch NR subject to generator voltage, switch NR being held in by the other coil. Switch T also engages contacts T5 to connect the generator shunt field winding GF across generator armature GA, the shunt circuit through resistance RE23 for field winding GF being open at contacts C3 and U4. The connection of generator shunt field winding GF across the generator armature renders the generator also self-exciting. This results in the gradual increase in the generator voltage to full value to cause the elevator car to be gradually brought up to full speed.

The coil of load switch relay XQ is connected in parallel with generator interpole field winding GIP, rendering this relay subject to the current of the generator armature motor armature circuit. This relay is set to operate during starting of the car when the load on the elevator motor is at or above a certain amount. Upon operation, this relay engages contacts XQ1, completing a circuit for the coil of load switch Q. The load switch operates to engage contacts Q3 to short circuit a portion of resistance RE26 in circuit with generator shunt field winding GF. This increases the excitation of the generator shunt field winding to assist the series field winding in compensating for load. The load switch relay XQ drops out upon recession of the starting current, the load switch being maintained operated through contacts Q2.

The car may be slowed down and stopped by returning car switch segment CSS to neutral, removing the bridge for contacts CU1—CU4. This may be done in steps or the segment may be returned directly to neutral position. It will be assumed that the segment is returned directly to neutral and in making a stop at a landing this is done as the car arrives at a certain distance from the landing. The disengagement of car switch segment CSS from contact CU4 breaks the circuit for the coils of first slow speed switch F and second slow speed switch relay XG. Switch F drops out to separate contacts F5 to remove the short circuit for a portion of resistance RE23 in circuit with generator levelling field winding GLF. It also engages contacts F6 to connect generator demagnetizing field winding GDF through contacts T5 across generator armature GA. The demagnetizing field winding acts to oppose the shunt field winding thereby causing the generator voltage to be gradually decreased and thus the elevator car to be slowed down.

If the load switch Q is not operated so that load switch contacts Q1 are not separated, the reengagement of contacts F1 upon the dropping out of switch F establishes a circuit for the coil of series field switch SF which operates to short circuit generator series field winding GSF. If the load switch is operated, contacts Q4 are engaged to short circuit a portion of resistance RE27 in circuit with generator demagnetizing field winding GDF. Contacts F6 also connect the coil of voltage relay VR through resistance RE25, contacts G2 and contacts T5 across generator armature GA causing this relay to operate. Upon operation, relay VR engages contacts VR1 bypassing contacts G1 in a maintaining circuit for the coil of fast speed switch T. Relay XG, upon dropping out, separates contacts XG1 to break the circuit for the coil of second slow speed switch G. Switch G, upon dropping out, separates contacts G2 removing the short circuit for resistance RE24 in circuit with the coil of voltage relay VR. It also engages contacts G3 and G4 to short circuit a portion of resistance RE27 in circuit with generator demagnetizing field winding GDF. This increases the strength of the demagnetizing field winding to nearly equal that of the shunt field winding.

The disengagement of the car switch segment CSS from contacts CU3 breaks the circuit for the coil of up direction switch relay XU. This relay drops out to separate contacts XU2, the circuit for the coils of switches HX, UX, U and H being maintained through contacts TX1 and UX2. The disengagement of the car switch segment from contacts CU2 breaks the circuit for the coil of switch DR. Switch DR drops out to reengage contacts DR1, the circuit for the coil of switch DO being maintained open at contacts HX3.

When the generator voltage has decreased to a certain value, voltage relay VR drops out separating contacts VR1. This breaks the circuit for the coil of fast speed switch T which drops out to separate contacts T5 disconnecting generator shunt field winding GF and generator demagnetizing field winding GDF from across the generator armature. Switch T also separates contacts T1 which, if the series field switch is operated, breaks the circuit for this switch causing it to drop out and remove the short circuit for the coil of generator series field winding GSF. Switch T also reengages contacts T2 to short circuit the coil of auxiliary fast speed switch TX. Switch TX drops out to separate contacts TX1, breaking the holding circuit for the coils of switches HX, UX, U and H.

If the car switch has been centered at the proper distance from the landing, the car will be in the levelling zone for that landing at this time. The reengagement of contacts F2 upon the dropping out of switch F completed the circuit for the coils of levelling switches ULV and DLV and also for the coil of door zone switch DZ. Assuming that the car is in the levelling zone below the landing at the time contacts TX1 drop out, up levelling switch contacts ULV2 are engaged to maintain the circuit for the coils of switches U and H. Switches HX and UX, however, drop out. Switch HX, upon dropping out, separates contacts HX2 to break the circuit for the coils of switches Q and TX, causing switch Q if operated to drop out.

Switches U and H maintain the circuit for the release coil of the brake B and for the generator levelling field winding GLF to cause the car to continue in operation at levelling speed to the landing. As the car nears the landing, door zone switch DZ operates to engage contacts DZ1, completing the circuit for the coil of door open switch DO. Switch DO operates to engage contacts DO1, DO2 and DO3 to complete the circuit for the stator windings of the door operating motor for operation to effect the opening of the car door and hoistway door. As the car arrives at the floor, levelling switch contacts ULV2 separate to break the circuit for the coils of switches U and H. The resultant separation of contacts U2, U3 and H6 causes the deenergization of generator levelling field winding GLF, the separation of contacts H6 also breaking the circuit for the release coil of the brake with the result that the car is brought to a stop. Switch H also reengages contacts H5 to reconnect resistance RE13 across the break release coil to control the application of the brake. Switch H also separates contacts H1 to reinsert resistance RE7 in the circuit for the elevator motor field winding MF. It also engages contacts H8 which, owing to the fact that switch U separates contacts U1 to break the circuit for the coil of suicide delay relay SUD to effect the reengagement of contacts SUD1 and SUD2, reconnects generator demagnetizing field winding GDF across the generator armature. The generator shunt field winding GF is not so reconnected owing to the separation of contacts H7. The generator demagnetizing field winding acts to counteract the residual flux of the generator field. The reengagement of contacts H2 reestablishes the circuit for series field switch SF which operates again to short circuit the generator series field winding GSF. The connection of the demagnetizing field winding across the generator armature and the short circuiting of the generator series field winding reduces the generator circulating currents to a minimum while the motor generator set is idling. The circuit for the upper coil of switch NR is deenergized along with breaking of the circuit for the generator levelling field winding GLF with the result that this switch drops out. Should the car overrun the landing, levelling switch contacts DLV2 act through switches D and H to effect the return of the car to the landing.

The opening of the doors takes place while the car is being brought to a stop. As they reach open position, door open limit switch DOL opens to break the circuit for the coil of switch DO. This switch drops out to disconnect the stator windings of the door operating motor from the supply lines.

The car is started in the down direction and brought to a stop in its downward travel in a similar manner. In operation in the down direction, down direction switch D, auxiliary down direction switch DX and down direction switch relay XD function instead of the corresponding up direction switches U, UX and XU.

To shut down the motor generator set and exciter set, key operated switch MGS is turned clockwise to remove the bridge for the lower contacts, breaking the circuit for the coil of switch ER. Switch ER drops out to separate contacts ER1, ER2 and ER3, disconnecting the stator windings of the exciter from the supply lines, thus shutting down the exciter set. It also separates contacts ER5 to break the circuit for the coil of switch KR. Switch KR drops out to separate contacts KR1, KR2 and KR3 to disconnect the stator windings of the driving motor for the motor generator set from the supply lines, thus shutting down the motor generator set.

Operation under open phase conditions will now be discussed. When the phase voltages applied to the stator windings of a three-phase induction motor are substantially balanced, there is no appreciable potential difference between a neutral for the motor and a neutral for the source. However, when due to an open phase condition single-phase voltage is applied to the motor, a potential difference exists between these two neutrals of an amount dependent upon whether or not the motor is running and, if the motor is running, upon the load on the motor. If the motor is not in operation when the open phase condition arises, upon operation of the motor starting switch, only single-phase voltage is applied to the motor and it can not start. Under such conditions the potential difference between the motor neutral and the source neutral is a maximum. If the motor is in operation at the time the open phase condition arises, the motor may continue to run as a single-phase motor, the rotor creating a rotating field to cause all three stator windings to be excited. The excitation is unbalanced, however, when the motor is subjected to load, the greater the load the greater the unbalance and the greater the unbalance the greater the potential difference of the neutral of the motor with respect to the neutral of the source. If the load on the motor is such as to cause it to stall, this potential difference becomes a maximum. The voltage between these neutrals may be utilized to operate a protective device. Where the source does not have a neutral or the neutral is not grounded, an artificial neutral may be provided as by connecting three impedances preferably condensers in star relation across the supply lines. Similarly, an artificial neutral can be formed for the motor where the stator windings are delta connected by connecting impedances in star relation across the lines leading to the motor at the motor terminals. In each case the star point of the impedances forms the neutral.

In the system illustrated, the coil or protective relay PT is connected between the neutral EN of the exciter motor and the neutral NS of the source by way of resistance RE4 and ground GR. Also the neutral DN of the door motor is connected through resistance RE3 to a junction point for the coil of protective relay PT and resistance RE4. The protective relay, upon operation, is latched either mechanically or magnetically in operated condition. This calls attention to the fault. A mechanical latch is indicated for this relay in Figure 1s. With such arrangement, the protective relay serves to protect all three polyphase motors from damage due to open phase conditions as will now be explained.

Assume that an open phase condition occurs at one of the fuses FU1, FU2 or FU3 or on the source side thereof while the car is running. Assume further that the load in the elevator car is such that the load on the elevator hoisting motor is substantially zero. Under such conditions the rotor GMR of driving motor GM creates a rotating field to cause excitation of all three stator windings GMS1, GMS2 and GMS3. Thus three-phase voltage exists at the terminals of driving motor GM the phase voltages of which are substantially balanced. Driving motor GM therefore acts as a three-phase generator to maintain substantially balanced three-phase excitation of the stator windings of exciter driving motor EM. Thus there is substantially no change in the potential of neutral EN of the exciter driving motor and protective relay PT is not operated. Should the open phase condition exist in either supply line I or supply line III to which the primary of transformer TRF is connected, the driving motor GM of the motor generator set also acts to cause sufficient voltage to be applied to this transformer to maintain switch ER operated. Thus the car continues in operation unaffected by the open phase condition and is brought to a stop at a landing as previously described by return of the car switch to neutral.

Assume now that the open phase condition occurs when the load on the elevator hoisting motor is such as to impose a positive load on driving motor GM of the motor generator set. This causes an unbalance of the phase voltages at the terminals of the driving motor GM and thus an unbalance of the phase voltages applied to the exciter driving motor EM. If the positive load on the elevator driving motor exceeds a certain amount the unbalance of the phase voltages applied to the stator windings of exciter driving motor EM is such as to create sufficient potential difference between the neutral EN of the exciter driving motor and the neutral of the source of supply to cause the protective relay to operate.

The protective relay, upon operation, separates contacts PT1 and PT2. The separation of contacts PT1 is without effect as during running of the car these contacts are by-passed by contacts DZR1 of the door zone relay. The separation of contacts PT2, however, breaks the circuit for the coils of first slow speed switch F and second slow speed relay XG, causing the car to slow down. Slow down is effected by the action of the generator demagnetizing field winding as previously described, this winding and the generator shunt field winding being disconnected from the generator armature upon the dropping out of voltage relay VR. The car is thus slowed down to the slow speed obtained when the generator is excited by generator levelling field winding GLF with resistance RE20 in series therewith, which is the speed of the car during the levelling operation. The car continues to operate at this slow speed until it is brought to a stop at a landing by the centering of the car switch. In this way the shutting down of the elevator car between floors under open phase conditions is obviated. As the car is brought to a stop, the circuit for the coil of door zone relay DZR is broken by the separation of contacts H4. Relay DZR drops out to separate contacts DZR1 removing the by-pass for the protective relay and thus breaking the circuit from the secondary winding of transformer TRF to rectifier RF. This causes the deenergization of exciter switch ER which drops out to shut down the exciter set and motor generator set as previously described.

Should the above assumed open phase condition exist while the car is stopped at a floor, as for example where the open phase condition arose during running of the car with the load on driving motor GM not great enough to cause the protective relay to operate, the car may be started in operation. If the load on driving motor GM is not such as to cause the operation of the protective relay, the car may be brought up to full speed. However, if the load is at or above a certain amount the protective relay operates to cause operation of the car at slow speed as previously described. When the car is brought to a stop at a landing the exciter set and motor generator set are shut down.

Should during operation of the car an open phase occur in the leads to the exciter driving motor as for example by the blowing of one of fuses FU4, FU5 or FU6, the generator driving motor can not provide three-phase excitation for the exciter driving motor so that the protective relay operates immediately. This causes the car to immediately slow down to slow speed and when the car is brought to a stop at a landing the motor generator set and exciter set are shut down.

The protective relay is set to operate at the voltage which exists when the load on the generator driving motor GM is such that the current flowing in the stator windings under open phase conditions if allowed to continue would cause severe heating and thus damage to the motor. The reduction of the speed of the motor when the protective relay operates removes the overload on the generator dirving motor, obviating the possibility of damage to this motor during the continued operation of the car in bringing it to a floor. The protective relay, being latched in operated condition, is not dropped out as a result of this decrease in load. Should, after the protective relay operates, the car be brought to a stop between floors, door zone switch contacts DZ1 remain closed so that the door zone relay remains operated and protective relay contacts PT1 remain by-passed. This enables the car to be restarted and brought to a floor at slow speed.

Should an open phase condition affecting only the exciter driving motor or affecting both the exciter driving motor and the generator driving motor exist at the time the circuits are established to start these motors in operation, the exciter driving motor can not start and the protective relay operates immediately. The resultant separation of contacts PT1 prevents operation of switch E, thereby preventing the starting of the motor generator set in case the open phase condition affects only the exciter driving motor.

When an open phase condition affecting both the exciter driving motor and the generator driving motor arises during operation of the car, as far example due to the blowing of any one of fuses FU1, FU2, or FU3, this condition also affects the door operating motor. If the load on the generator driving motor is not such as to cause the protective relay to operate, this motor acts to cause the excitation of the stator windings of the door operating motor DM to be sufficiently balanced three phase as not to cause operation of the protective relay during door operation. Should the load have been such that the protective relay operated, due to the reduction in load sufficiently balanced excitation is provided for the door operating motor for the door opening operation. This excitation is discontinued upon the shutting down of the motor generator set as a result of the separation of contacts DZR1 to remove the by-pass for contacts PT1 when the car is brought to a stop at the landing but at least a partial opening of the door is obtained due to the advance initiation of the door opening operation.

Should the open phase condition affect only the door operating motor, as for example where it is due to the blowing of any one of fuses FU7, FU8 and FU9, upon the closure of either door open switch DO or door close switch DC or upon the occurrence of the open phase condition when one of these switches is already closed, the protective relay operates immediately. The open phase condition causes a difference in potential of the neutral DN with respect to the neutral NS of the source of supply. Since the neutral EN of the exciter driving motor is of the same potential as the source neutral, the same difference of potential exists between neutrals DN and EN as between neutrals DN and NS. There is a path for current flow between neutrals DN and NS through resistances RE3 and RE4 and ground. There is a path of current flow between neutrals DN and EN through resistance RE3 and the coil of protective relay PT. The impedance of the circuit through the coil of the protective relay relative to that of the circuit through resistance RE4 and ground is such that sufficient voltage is applied to the coil of the protective relay to cause its operation. The operation of the protective relay shuts down the exciter set and the motor generator set as before. If the operation of the protective relay occurs incident to an opening operation, contacts PT1 become effective to cause the shut down as soon as contacts DZR1 separate. If it occurs incident to a closing operation, contacts PT1 are effective immediately to cause the shut down as they are not by-passed by contacts DZR1 at this time. Resistance RE3 is adjusted to give the desired operating voltage under open phase conditions.

Thus one protective relay serves to protect all three of the three-phase motors under open phase conditions affecting any or all of them. The circuit may be arranged to shut down the motor generator set and exciter set immediately regardless of whether the car is running or not. The control system may be varied and also the invention is applicable to other forms of elevator control systems. In systems in which the car is stopped automatically at the landings, as in response to calls registered as by push buttons, the protective relay may be arranged to control the circuits to cause, when the relay operates, stopping of the car at the next landing.

Other control arrangements for the door operating motor may be provided, depending upon the characteristics of the installation. The door motor may be used for operating the car door with the hoistway doors manually operated. In many systems, the door operating motor is a direct current motor. In such event, open phase protection is provided only for the exciter set driving motor and the motor generator set driving motor.

The protective apparatus has been illustrated as an electromagnetic switch having its coil connected in a circuit from a neutral for the supply lines and a neutral for the phase windings of apparatus supplied therefrom, but it is to be understood that other forms of electroresponsive devices subject to the current in a neutral circuit may be employed. Also, certain arrangements of circuits have been illustrated for connecting the electroresponsive device to be subject to the current in a circuit between neutrals, but other circuit arrangements may be employed. While the invention has been specifically described as applied to the protection of three-phase alternating current squirrel cage induction motors utilized in elevator systems, it is also applicable to the protection of three-phase induction motors used in other electrical systems and to motors with wound rotors. It is also applicable to polyphase motors of other numbers of phases where a neutral exists for or may be provided for the source of supply. It may also be employed for protecting other polyphase alternating current apparatus, such for example as transformers, connected in parallel with the stator windings of the motor.

As many changes could be made in the above arrangements and many apparently widely different embodiments and applications of this invention could be made without departing from the scope thereof, it is intended that all matter contained in the above description or shown in the accompanying drawings shall be interpreted as illustrative and not in a limiting sense.

What is claimed is:

1. An electrical system in which two polyphase induction motors are connected in parallel to the supply lines of a source of polyphase alternating current, characterized in that there is provided means responsive to the difference in potential between a neutral for one of said motors and a neutral for said source when an open phase condition arises in the supply lines common to said motors for protecting both of said motors.

2. An electrical system in which a three-phase induction motor is supplied with current from a source of three-phase alternating current, and in which a smaller three-phase induction motor is supplied with current from said source, being connected to the supply lines of said source in parallel with said first named motor, characterized in that there is provided an electroresponsive device connected in a circuit extending from a neutral for said smaller motor to a neutral for said source so as to be subject when an open phase condition arises in the supply lines common to both of said motors to a voltage determined by the load on the first named motor for protecting both of said motors.

3. An electrical system in which a three-phase induction motor supplied with current from a source of three-phase alternating current drives a direct current generator, and in which a smaller three-phase induction motor also supplied with current from said source drives a small direct current generator, said smaller motor being connected to the supply lines of said source in parallel with said first named motor, characterized in that a relay is provided for protecting said motors when an open phase condition arises in the supply lines common to them, said relay having an operating coil connected in a circuit extending from a neutral for said smaller motor to a neutral for said source.

4. An elevator installation in which the elevator car is raised and lowered by a direct current motor supplied with current from a variable voltage direct current generator driven by a three-phase induction motor connected to the supply lines of a source of three-phase alternating current, and in which a direct current exciter is provided which is driven by a three-phase induction motor also connected to the supply lines of said source, being connected in parallel with said generator driving motor so as to be excited therefrom upon the occurrence of an open phase condition affecting both of them, characterized in that a relay is provided for protecting both of said driving motors under open phase conditions, said relay having an operating coil connected in a circuit extending from a neutral for said exciter driving motor to a neutral for said source so as to be subject when an open phase condition in the supply lines common to said driving motors arises during running of the car to a voltage determined by the load on the generator driving motor and operable at the voltage which exists when the load on said generator driving motor exceeds a certain amount.

5. An elevator installation in which the elevator car is raised and lowered by a direct current motor supplied with current from a variable voltage direct current generator driven by a three-phase induction motor connected to the supply lines of a source of three-phase alternating current, in which a direct current exciter is provided which is driven by a three-phase induction motor connected to said supply lines in parallel with said generator driving motor so as to be excited from the generator driving motor upon the occurrence of an open phase condition in the supply lines common to both of them, in which fuses are provided in the supply lines common to said driving motors, and in which separate fuses are provided in the feed lines for the exciter driving motor only, characterized in that a relay is provided for protecting both of said driving motors under open phase conditions, said relay having an operating coil connected in a circuit extending from a neutral for said exciter driving motor to a neutral for said source so as to be subject when an open phase condition in the supply lines common to said driving motors arises during running of the car to the potential difference between said neutrals determined by the load on the generator driving motor and when an open phase condition in the feed lines to said exciter driving motor arises during running of the car to the potential difference between said neutrals unaffected by the load on the generator driving motor.

6. An elevator installation in which the elevator car is raised and lowered by a direct current motor supplied with current from a variable voltage direct current generator driven by a three-phase induction motor connected to the supply lines of a source of three-phase alternating current, and in which a direct current exciter is provided which is driven by a three-phase induction motor which is connected to said supply lines in parallel with said generator driving motor so as to be excited from the generator driving motor upon the occurrence of an open phase condition in the supply lines common to both of them, characterized in that a protective relay is provided having an operating coil connected in a circuit extending from a neutral for said exciter driving motor to a neutral for said source so as to be subject when an open phase condition in the supply lines common to said driving motors arises during running of the car to a voltage determined by the load on the generator driving motor and so as to be subject when an open phase condition in the supply lines individual to said exciter driving motor arises to a voltage determined by the load on the exciter driving motor, said relay operating when the voltage applied thereto exceeds a certain value, and in that means controlled by said relay upon operation thereof is provided for causing the disconnection of said driving motors from said source.

7. An elevator installation in which the elevator car is raised and lowered by a direct current motor supplied with current from a variable voltage direct current generator driven by a three-phase induction motor in which a direct current exciter is provided which is driven by a three-phase induction motor, in which a source of three-phase alternating current is provided, and in which switching means is provided for connecting said driving motors in parallel to the supply lines of said source whereby said exciter driving motor is excited from said generator driving motor upon the occurrence of an open phase condition in the supply lines common to both of them, characterized in that a protective relay is provided having an operating coil connected in a circuit extending from a neutral for said exciter driving motor to a neutral for said source so as to be subject when an open phase condition in the supply lines common to both said driving motors arises during running of the car to a voltage determined by the load on the generator driving motor and operable at the voltage which exists when the load on said generator driving motor exceeds a certain amount, and in that said switching means is controlled by said relay to cause as a result of the operation of said relay the disconnection of both said driving motors from said source.

8. An elevator installation in which the elevator car is raised and lowered by a direct current motor supplied with current from a variable voltage direct current generator driven by a three-phase squirrel cage induction motor, in which a direct current exciter is provided which is driven by a three-phase squirrel cage induction motor, in which a source of three-phase alternating current is provided, in which switching means is provided for connecting said driving motors in parallel to the supply lines of said source whereby said exciter driving motor is excited from said generator driving motor upon the occurrence of an open phase condition affecting both of them, and in which means is provided for reducing the speed of and for stopping the elevator motor, characterized in that a protective relay is provided having an operating coil connected in a circuit extending from a neutral for said exciter driving motor to a neutral for said source so as to be subject when an open phase condition in the supply lines common to both said driving motors arises during running of the car to a voltage determined by the load on the generator driving motor and operable at the voltage which exists when the load on said generator driving motor exceeds a certain amount, said relay controlling said speed reducing and stopping means to cause upon operation of said relay the elevator car thereafter to run at a slower speed until it is brought to a stop at a landing, thus effecting a reduction in the load on said generator driving motor.

9. An elevator installation in which the elevator car is raised and lowered by a direct current motor supplied with current from a variable voltage direct current generator driven by a three-phase squirrel cage induction motor, in which a direct current exciter is provided which is driven by a three-phase squirrel cage induction motor, in which a source of three-phase alternating current is provided, in which switching means is provided for connecting said driving motors in parallel to the supply lines of said source whereby said exciter driving motor is excited from said generator driving motor upon the occurrence of an open phase condition affecting both of them, and in which means is provided for reducing the speed of and for stopping the elevator motor, characterized in that a protective relay is provided having an operating coil connected in a circuit extending from a neutral for said exciter driving motor to a neutral for said source so as to be subject when an open phase condition in the supply lines common to both said driving motors arises during running of the car to a voltage determined by the load on the generator driving motor and operable at the voltage which exists when the load on said generator driving motor exceeds a certain amount, said relay controlling said speed reducing and stopping means to cause upon operation of said relay slow down of the elevator car and thus a reduction in the load on said generator driving motor, said relay also controlling said switching means to disconnect said exciter driving motor and generator driving motor from said source, in that means is provided for rendering said relay ineffective to cause operation of said switching means to disconnect said driving motors until the car is brought to a stop at a landing, and in that means is also provided for retaining said relay in operated condition.

10. An electrical system in which two three-phase induction motors are adapted for connection in parallel to a source of three-phase alternating current, characterized in that means responsive to the current flow in a circuit extending from a neutral for one of said motors to the junction of a circuit through an impedance to a neutral for said source and a circuit through an impedance to a neutral for the other motor is provided for protecting said motors under open phase conditions affecting either or both of them.

11. An elevator installation in which a direct current exciter is driven by a three-phase induction motor supplied with current from a source of three-phase alternating current, and in which a three-phase induction door operating motor is also supplied with current from said source in parallel with said driving motor, characterized in that a single relay is provided for protecting both said motors under open phase conditions, said relay having an operating coil connected in a circuit extending from a neutral for said exciter driving motor to a neutral for said source, and in that the side of said operating coil opposite to that connected to said neutral for said exciter driving motor is connected to a neutral for said door motor.

12. An elevator installation in which the elevator car is raised and lowered by a direct current motor supplied with current from a variable voltage direct current generator driven by a three-phase squirrel cage induction motor supplied with current from a source of three-phase alternating current, in which a direct current exciter is provided which is driven by a three-phase squirrel cage induction motor, and in which a three-phase squirrel cage induction door operating motor is provided, said exciter driving motor and said door motor being adapted for connection to the supply lines of said source in parallel with said generator driving motor so that they can be excited from said generator driving motor upon the occurrence of an open phase condition in the supply lines common to all of them, characterized in that a singe relay is provided for protecting both said driving motors and said door motor under open phase conditions, said relay having an operating coil connected in a circuit extending from a neutral for said exciter driving motor to an impedance connected to a neutral for said source so as to be subjected when an open phase condition in the supply lines common to said driving motors arises during running of the car to a voltage determined by the load on the generator driving motor, and in that a neutral for said door motor is connected to said operating coil and said impedance so as to cause operation of said relay when a circuit is established for said door motor under open phase conditions in the supply lines individual to said door motor.

13. An elevator installation in which the elevator car is raised and lowered by a direct current motor supplied with current from a variable voltage direct current generator driven by a three-phase squirrel cage induction motor supplied with current from a source of three-phase alternating current, in which a direct current exciter is provided which is driven by a three-phase squirrel cage induction motor, in which a three-phase squirrel cage induction door operating motor is provided, said exciter driving motor and said door motor being adapted for connection to said source in parallel with said generator driving motor so that they can be excited from said generator driving motor upon the occurrence of an open phase condition in the supply lines common to all of them, characterized in that a single relay is provided for protecting both said driving motors and said door motor under open phase conditions, said relay having an operating coil connected on one side to a neutral for said exciter driving motor and on the other side through an impedance to a neutral for said source so as to be subject when an open phase condition in the supply linges common to both said driving motors arises during running of the car to a voltage determined by the load on the generator driving motor and when an open phase condition arises in the supply lines individual to said exciter driving motor to a voltage determined by the load on the exciter driving motor and operable when the voltage applied to said coil exceeds a certain value, in that said other side of said operating coil is also connected through an impedance to a neutral for said door motor to cause operation of said relay when a circuit is established for said door motor under open phase conditions in the supply lines individual to said door motor, and in that means is provided which is controlled by said relay to disconnect said driving motors and said door motor from said source, and in that means is provided for rendering said disconnecting means ineffective except until the car is stopped at a landing.

JACOB DANIEL LEWIS.
MATHEW TROSTER, Jr.
NORMAN WILLIAM SEDERBERG.

REFERENCES CITED

The following references are of record in the file of this patent:

UNITED STATES PATENTS

| Number | Name | Date |
|---|---|---|
| 1,776,132 | Piloty | Sept. 16, 1930 |